United States Patent [19]
Nara et al.

[11] 3,870,248
[45] Mar. 11, 1975

[54] TAPE PLAYER

[75] Inventors: Hirotoshi Nara, Urawa; Wataru Watanabe, Hagi; Tadashi Yokota, Urawa; Chiak Yanagi, Tokyo, Japan

[73] Assignee: Clairion Co., Ltd., Tokyo, Japan

[22] Filed: Sept. 27, 1972

[21] Appl. No.: 292,673

[30] Foreign Application Priority Data

Sept. 30, 1971 Japan .......................... 46-88745[U]
Sept. 30, 1971 Japan .......................... 46-89732[U]

[52] U.S. Cl. .................................. 242/198, 360/74
[51] Int. Cl.... G03b 1/04, G11b 15/32, G11b 23/04
[58] Field of Search .................... 242/198, 201–104; 274/4 C, 4 D, 11 C, 11 D

[56] References Cited

UNITED STATES PATENTS 3,385,534 5/1968 Staar .................................. 242/200
3,533,633 10/1970 Wilder .................................. 274/4 D
3,716,242 2/1973 Maruyama .......................... 274/4 D
3,758,049 9/1973 Staar .................................. 242/201

*Primary Examiner*—Leonard D. Christian
*Attorney, Agent, or Firm*—William Anthony Drucker

[57] ABSTRACT

In a tape player of the type wherein a cassette containing a pair of reels on which a sound tape is wound is removably loaded in a predetermined position of a base of the player, the tape is passed between a first pair of a pinch roll and a capstan and between a second pair of a pinch roll and a capstan and said first and second pairs are selectively operated to reverse the direction of running of the tape with respect to a sound reproducing head thereby enabling continuous reproduction of a plurality of channels recorded on the tape, there are provided switching means for selectively operating either one of the first and second pairs, and control means for urging the switching means always in a given direction thereby enabling loading of the cassette while the tape is driven in a given direction.

6 Claims, 11 Drawing Figures

TAPE PLAYER

BACKGROUND OF THE INVENTION

This invention relates to apparatus for controlling the direction of running of a magnetic tape in a tape player, and more particularly to apparatus for controlling the direction of running of a tape of a two reel type cassette tape player such that the tape is always started in a given direction whereby to assure an appropriate sound recording or sound reproduction.

The magnetic tape used in a two reel type cassette tape recorder is generally formed with tracks for two channels and when reproducing such a tape the channels are switched by a mannual reversing system or an automatic switching system. With the mannual reversing system the direction of tape running is always maintained in a given direction. More particularly, when a tape whose first channel has been selected has reproduced to its one end, the cassette is once removed from the player and then reloaded in the player after turning inside out. Thereafter the tape is driven in the same direction as the first channel to reproduce the second channel. In this manner, since this mannual reversing system requires mannual turning inside out and unloading and reloading operations, its maneuver is troublesome so that this system is not suitable for use in tape players to be mounted on motor cars.

The automatic switching system also known as an automatic reversing system is constructed such that when a tape has been reproduced to one end thereof, the drive system of the player is automatically switched to drive the reels in the opposite direction so as to reproduce by paying out the tape from one reel and taking up the tape on the other reel. Thus, this automatic reversing system is very advantageous because two channels are automatically and continuously reproduced without requiring any unloading and turning inside out operations. However, with this automatic reversing system, it is impossible to confirm the stop position of the tape player at the end of the previously reproduced channel. For this reason, it is necessary to load the cassette under a condition capable of reproducing either one of the channels and then confirm whether the reproduced channel is the desired one or not. If the desired channel is not reproduced, the cassette must be unloaded, turned inside out and then reloaded which is of course troublesome.

SUMMARY OF THE INVENTION

Accordingly, it is an object of this invention to provide a tape player provided with a novel control device capable of loading a cassette while the tape is driven in a given direction.

Another object of this invention is to provide a novel tape player capable of reproducing the tape by always starting from a first channel irrespective of the fact that which one of the channels was selected during previous running.

Still another object of this invention is to provide a novel tape player capable of preventing accidental movement of a channel switching member caused by vibration while the cachet is unloaded.

In accordance with this invention these and other objects are accomplished by providing a tape player of the type wherein a cassette containing a pair of reels on which a sound tape is wound is removably loaded in a predetermined position of a base of the player, the tape is passed between a first pair of pinch roller and a capstan and between a second pair of a pinch roller and a capstan, and the first and second pairs are selectively operated to reverse the direction of running of the tape with reference to a sound reproducing head thereby enabling continuous reproduction of a plurality of channels recorded on the tape, characterized in that there are provided switching means for selectively operating either one of the first and second pairs, and control means for urging the switching means always in a given direction thereby permitting loading of the cachet while the tape is driven in a given direction.

BRIEF DESCRIPTION OF THE DRAWINGS

Further objects and advantages will be better understood from the following detailed description taken in conjunction with the accompanying drawings in which:

FIG. 4A through FIG. 4C show the construction and operation of the control device wherein FIG. 4A is a plan view showing a condition in which a movable plate is lowered to the control position, FIG. 4B shows a sectional view of the control device under this condition; FIG. 4C is a plan view showing a condition in which the movable plate is raised and FIG. 4D shows a sectional view of the control device under this condition;

DESCRIPTION OF THE PREFERRED EMBODIMENTS

Figure 1:
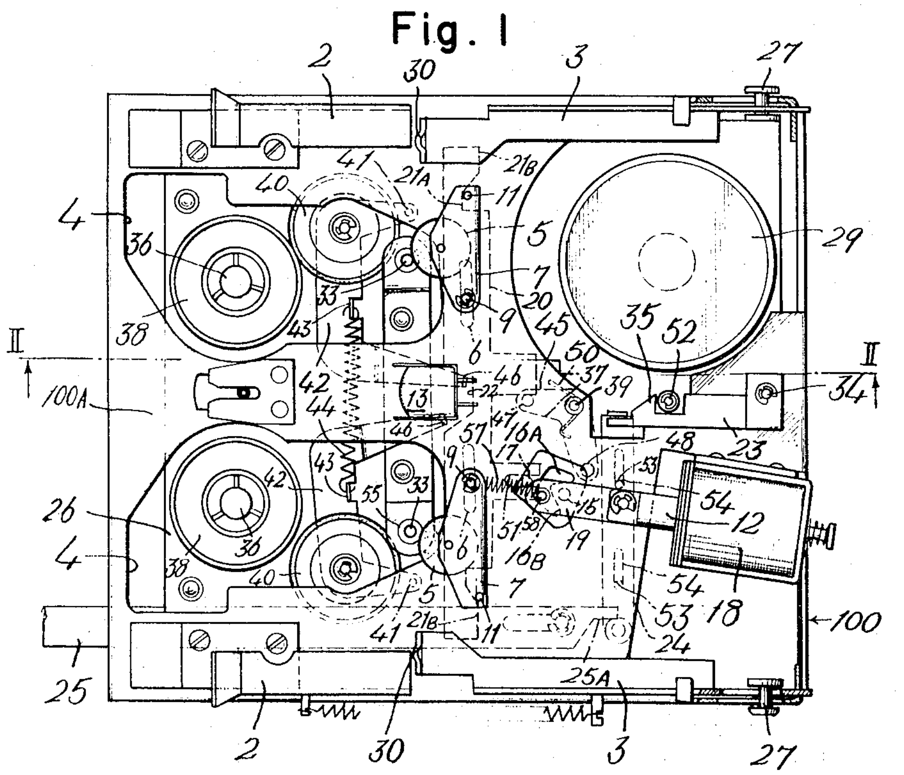
FIG. 1 is a plan view showing the deck portion of one embodiment of the tape player embodying the invention.

FIGS. 1 to 5 show an application of this invention to a tape player of the type in which a movable plate is provided to be raised and lowered in a space below a deck 100 A of a base 100 of the player. The tape player illustrated is constructed such that by merely loading a cachet in a receiver of the player, a reel driving shaft for the cassette and another elements are operated to reproduce the cassette. As above described, this type of tape player is easy to manipulate so that it can be advantageously mounted on a motor car. A pair of opposing cassette guides 2 are mounted on the opposite sides of base 100 to removably receive a cassette C (see FIG. 6) which contains two reels 56 having central hubs **56*a*. A tape 102 is reciprocated between two reels. To the right (as viewed in FIGS. 1 and 2) of each reel guide 2 is provided a slidable set member 3. Deck 100A is provided with two windows 4 between the reel guides 2 and to the right of each window 4 is provided a roller supporting member 7 which is pivotably mounted at its one end on the deck 100A by means of a pivot shaft 9. Two supporting members 7 are mounted symmetrically with respect to the longitudinal center line of the deck. Each roller supporting member 7 supports a pinch roller 5 and is normally urged toward the window 4** by means of a resilient member in the form of a coil spring 8. A downwardly projecting pin 11 is secured to the outer end of each supporting member 7. The lower end of pivot shaft 9 projecting through deck 100A is received in an elongated slot 6 of a switching member or plate 20 to guide the movement thereof as will be described later.

A magnetic head 13 is positioned between pinch rollers 5, the magnetic head 13 including at least two head elements, not shown, suspended one upon the other. To the right of the magnetic head 13 are provided an electric motor 29 and an electro-magnet 18, the plunger 12 thereof being connected to an operating member 19. A pin 58 secured to the outer end of the operating member 19 is received in a generally V-shaped guide slot 16 of a plate cam 14 swingably mounted on base 100 by means of a pivot shaft 15, the slot 16 having legs 16A and 16B. A spring 57 is interposed between pin 58 and pivot shaft 9. A downwardly projecting guide pin 17 is provided for plate cam 14 at one side thereof opposite the pivot shaft 15. The switching member 20 is provided to extend below the two roller supporting members 7 to be moved longitudinally along elongated slots 6. The switching member 20 is provided with bifurcated projections 51 between which guide pin 17 is received. A pair of adjacent cams 21A and 21B are formed on one end of switching member 20 and a re-entrant notch 22 is formed at the center of the opposite side of the switching member 20. Pin 11 of each roller supporting member 7 is disposed to cooperate with cams 21A and 21B so that when the switching member 20 is moved in one direction the pins 11 will be guided by cam 21B to retract one pinch roller 5 whereas to advance the other pinch roller 5 thereby urging the latter pinch roller against a capstan shaft 33. A release lever 25 is provided along one side (lower side as viewed in FIG. 1) to cooperate with a pusher 24 at its inner end, the pusher being guided to move in the vertical direction as viewed in FIG. 1 by slot 54 and pins 53 secured to deck 100A. The pusher 24 is disposed to operate a locking lever 23 with one end pivotably mounted on deck 100A at 34 so as to cause the locking lever 23 to engage and disengage a roller 52 mounted on a movable plate 26 shown in FIG. 2.

Figure 2:
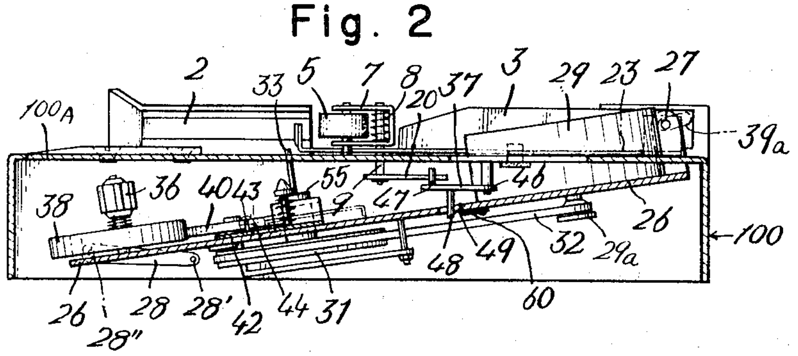
FIG. 2 shows a sectional view of the tape player taken along a line II — II in FIG. 1.
Figure 5:
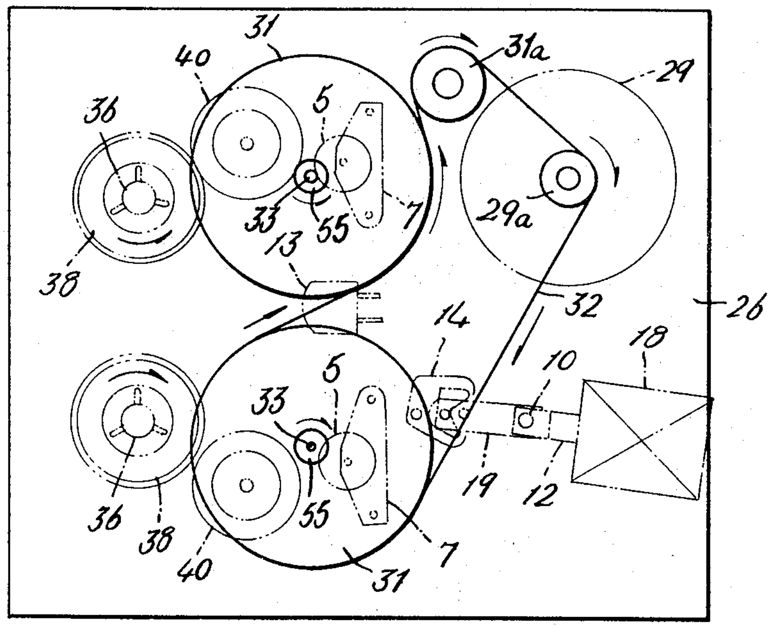
FIG. 5 is a bottom view of the deck showing a driving system utilizing an electric motor.

As shown in FIG. 2, the upper end of the movable plate 26 is pivotably mounted on base 100 by means of an inclined slot 39*a* and a pin 27 whereas the lower end of the movable plate 26 is connected with a link 28 through a pivot pin 28'', the opposite end of the link 28 being connected to the base 100 through a pivot pin 28'. The movable plate 26 carries electric motor 29, pulley 31 including capstan shafts 33, a pulley 38 including reel driving shafts 36 and follower wheels 40 which are interposed between respective pulleys 28 and small rollers 55 on capstan shafts 33 and are maintained in a driving relationship with the pulleys 38 and small rollers 55. A belt 32 is provided to pass about a pulley 29*a* on the shaft of the motor 29 and pulleys 31. As best shown in FIG. 5 an idle guide roller 31*a* is provided to cause the belt 32 to surround at least one-fourth of the periphery of each pulley and to rotate these pulleys 31 and the capstans 33 driven thereby in the opposite directions. Follower wheels 40 are mounted at one corner of a pair of symmetrically disposed C-shaped supports 42 which are pivotably mounted on movable plate 26 by means of pivot pins 41 at one ends. Bent up projections 43 are provided near the centers of respective supports 42 and a tension spring 44 is connected between these projections to rotate the supports 42 about their pivot pins 41 along the upper surface of the movable plate 26. The free end 46 of one of the supports 42 is brought into engagement with the notch 22 of the switching member 20 (thereby moving it longitudinally) when the movable plate 26 is raised to the position shown in FIG. 1 from the lowered position shown in FIG. 2. More particularly, when the upper support 42 (see FIG. 1) is brought into engagement with switching member 20 and when the switching member 20 is moved upwardly as viewed in FIG. 1 upper C-shaped support 42 will be rotated in the counterclockwise direction about pivot pin 41 to bring upper follower wheel 40 into driving engagement with upper pulley 38 and upper small roller 55.

According to this invention, a control member in the form of a bell crank 37 is pivotably mounted on the lower surface of deck 100A by means of a pivot shaft 39 at the knee of the bell crank 37. A pin 47 is secured to one end of the bell crank 37 to cooperate with a projection 59 provided for the switching member 20. Additional pin 48 is secured to the opposite end of the bell crank 37 to extend downwardly to freely pass through an opening 49 of the movable plate 26. The control member 37 is normally biased to rotate in the clockwise direction as viewed in FIGS. 1 and 3 by means of a spring 50 (FIG. 1) surrounding pivot shaft 39 or a tension spring 50' shown in FIG. 4 whereby the switching member 20 is normally biased to the left as viewed in FIGS. 3 and 4. The opening 49 has a sufficiently large dimension so that even when the movable plate 26 is raised as above described positive engagement between pin 48 and opening 49 can be assured. An antifriction member 60 (FIG. 2) is secured to one side of the opening 49 at which pin 48 engages the opening 49.

Figure 6:
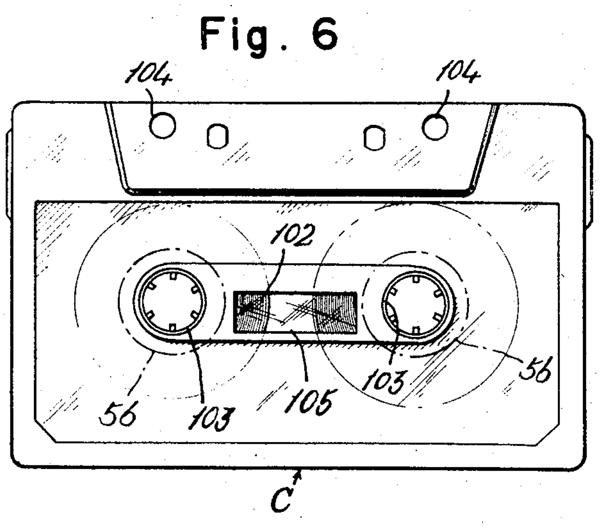
FIG. 6 is a plan view of a cassette.

The cassette C to be used in the tape player constructed as above described is shown in FIG. 6. As shown, the magnetic tape 102 is wound around hubs 103 of two reels and openings 104 for receiving capstan shafts 33 are formed through the front wall of the cassette C as is well known in the art. At the center of the front wall there is provided a window 105 for supervising the condition of the tape 102.

The tape player described above operates as follows: cassette C is loaded between cassette guides 2 while the movable plate 26 is tilted about pivot shaft 27 to bring the lefthand end of the movable plate to the lowered position as shown in FIG. 2. Then the righthand end of the cassette engages bent pieces 30 on the inner ends of set members 3 to move them to the right whereby the pivot shafts 27 are moved to the right along inclined slots 39*a* together with the movable plate 26. As a result, the link 28 connected to the opposite end of the movable plate 26 is rotated in the clockwise direction until this opposite or lefthand end of the movable plate 26 is brought close to the lower surface of the deck 100A of the base 100. This upward motion of the movable plate 26 pushes reel driving shafts 36 mounted thereof into the reel hubs of cassette C from under thereby establishing a driving connection for the tape. Roller 52 mounted on the movable plate 26 which has been raised as above described will be brought into engagement with locking lever 23 to rotate it about pivot shaft 34. When the roller 52 is caught by a notch 35 the movable plate 26 will be locked in the raised position.

Under these conditions, it is possible to reproduce the tape.

Figure 3:
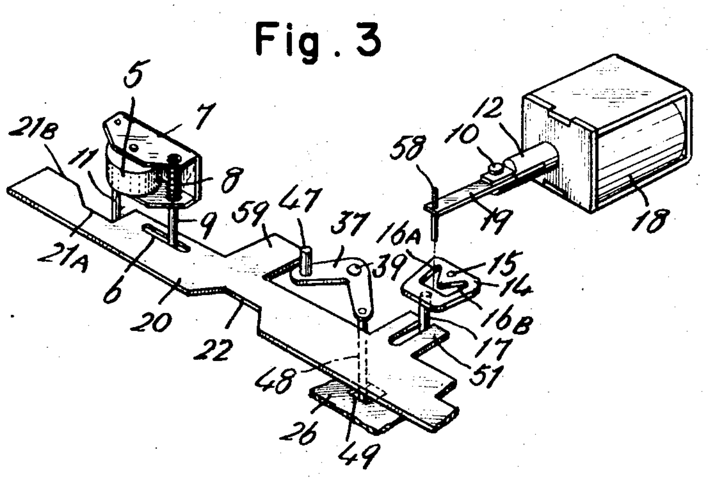
FIG. 3 is a perspective view showing a relationship between a switching plate, a control device therefor, a pinch roller and a plunger of an electromagnet.

When the first channel is selected and when the tape is driven in the forward direction (to the left as viewed in FIG. 6), the switching member 20 is moved to the left as viewed in FIGS. 3 and 4 (but toward upper as viewed in FIG. 1) to urge the lefthand pinch roller 5 agaist roller 55 mounted on capstan shaft 33 to clamp the tape between rollers 5 and 55 thereby commencing to move the tape in the forward direction in a manner well known in the art. As the switching member 20 is moved to the left as above described, pin 11 of the roller supporting member 7 (which is shown on the upper side in FIG. 1) will engage cam 21A of the switching member 20 so as to rotate the supporting member 7 in the counter-clockwise direction as viewed in FIG. 3 under the force of spring 8 whereby the roller 5 is brought into positive driving relationship with respect to the roller 55 on capstan shaft 33. During this forward running the upper track of the tape in the loaded cassette is reproduced so that an element of the magnetic head corresponding to the upper track supplies a signal to a preamplifier (not shown). As is well understood by one skilled in the art the switching between the elements of the magnetic head is performed by a slide switch, not shown, operated by the switching member 20. When the first channel is selected as above described and when the tape is driven to one end, this condition is detected by a well known detecting device (not shown) to energize electromagnet 18. Then the plunger 19 is attracted to move pin 58 of the operating member 19 along righthand leg 16B of guide slot 16 thereby rotating the plate cam 14 in the counterclockwise direction as viewed in FIG. 3. As a result, pin 17 moves the switching member 20 to the right (downwardly as viewed in FIG. 1) whereby the lower pinch roller 5 is urged against the roller 55 on the lower capstan shaft 33 (FIG. 1) to feed the tape in the opposite direction.

Figure 4A:
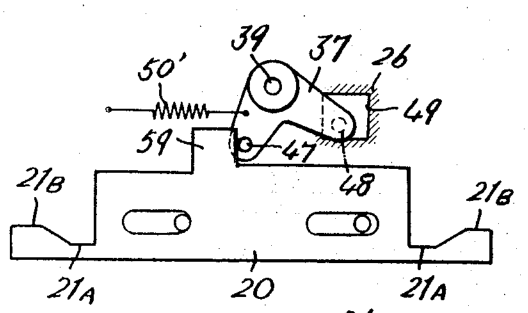
Figure 4B:
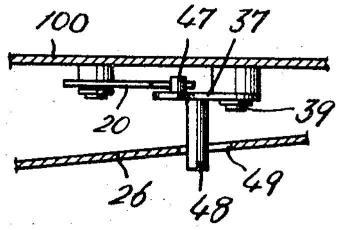
Figure 4C:
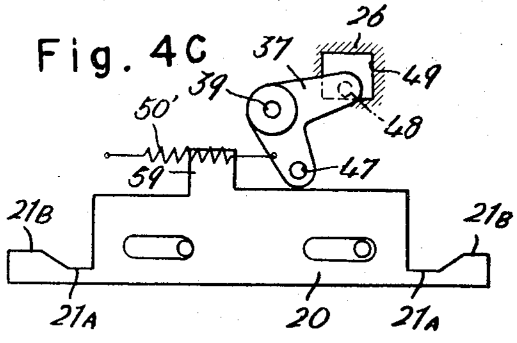
Figure 4D:
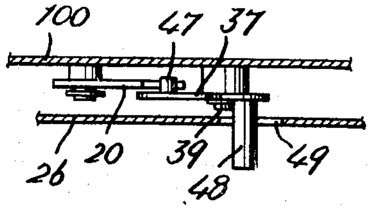

When the cassette is loaded and unloaded to feed the tape as above described the control device 37 operates as follows while the cassette C is unloaded. More particularly, under these conditions, since the movable plate 26 is not raised as shown in FIG. 4B, the operating pin 48 is not engaged by the wall of the opening 49 so that the control device 37 is rotated in the clockwise direction to the position shown in FIG. 4A. Under these conditions, the switching member 20 is moved to its extreme lefthand position (FIG. 4A) that is the condition permitting reproduction of the first channel. In this manner, the condition of reproducing the first channel is established while the cassette C is unloaded, so that whenever the cassette C is loaded the first channel is always reproduced. Because, when the cassette C is loaded under these conditions the movable plate 26 is raised to insert pin 48 more deeply into opening 49 with the result that the control device 37 is rotated in the counterclockwise direction against the action of spring 50'. As a result, the other pin 47 is disengaged from projection 59 of the switching member 20 thereby permitting the switching member 20 to move freely to the left or right as shown in FIG. 4C. But since the switching member 20 is left in the lefthand position it will be clear that the first channel is firstly reproduced as above described. When the switching member 20 is moved to the left by pin 47 while the cassette C is unloaded the switching member 20 is held in its loaded condition thereby preventing the switching member 20 from moving longitudinally under mechanical vibration or shocks which are applied to member 20 when the tape player is mounted on a motor car. This ensures the conditions of reproducing the first channel whenever the cassette is loaded.

In the above described embodiment, since unloading of the cassette C is possible, that is the movable plate 26 is lowered only when the release lever 25 is moved to the right, it may be said that release lever 25 and pusher 24 constitute an operating means that establishes a condition of firstly reproducing the first channel. In a tape player of the type wherein the locking lever 23 and the roller 52 engaged thereby are not used, the projection 59 may be formed on the lower side edge of the switching member (to the right as viewed from the loading opening of the tape player) so as to cause a cam (not shown) provided on the releasing lever 25 to act upon the projection 59. When constructed in this manner, it is possible to utilize the releasing lever 25 as a control device. In other words, it is possible to operate directly the switching member 20 by the releasing lever 25 so as to establish the condition that permits first reproduction of the first channel.

Further, in the above described embodiment while the switching member 20 is operated when the movable plate 26 is lowered it is also possible to operate the switching member 20 for establishing the condition of reproducing the first channel at a time before the cassette is not yet completely loaded when loading the cachet. This can be accomplished by causing an operating member in the form of a cam (not shown) or the like provided for the movable plate 26 to engage the projection 59 of the switching member 20 while the movable plate is being moved to the raised position from the lowered position shown in FIG. 2. Such a modification may be made by taking into consideration the type of the tape player or other factors.

Figure 7:
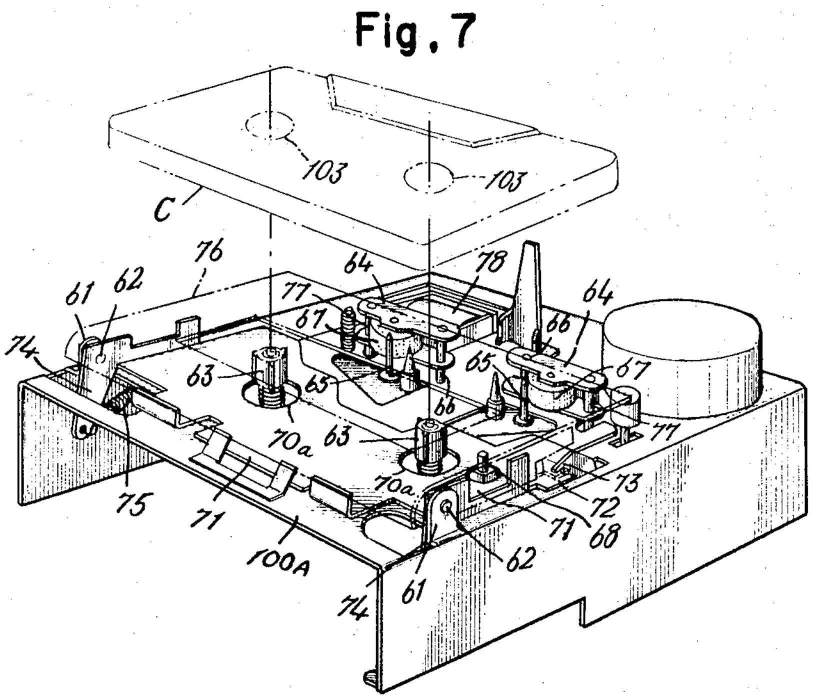
FIG. 7 is a perspective view of a modified embodiment of this invention.
Figure 8:
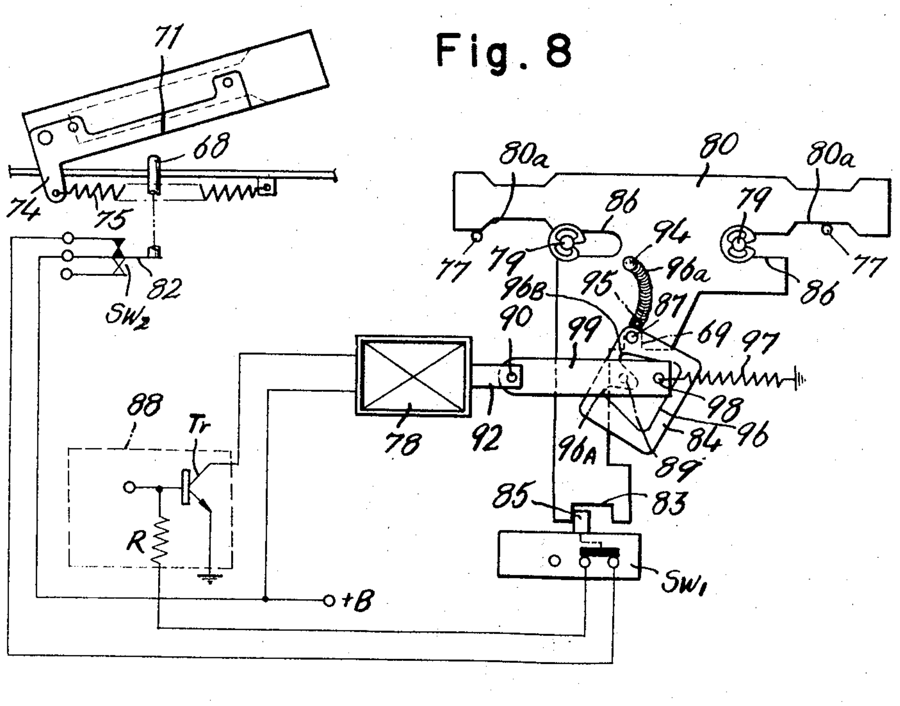
FIG. 8 is a diagram showing an electrical connection for operating the switching plate.

FIGS. 7 and 8 illustrate another embodiment of this invention. More specifically, one side of a movable plate 71 adapted to hop-up a cassette C is supported on the deck 100A of the base of a tape player by means of bearing shaft 61 journalled in bearing pedestals 62. A projection 72 formed on the right-hand side of movable plate 71 cooperates with a locking member 73 which is operated by a suitable releasing mechanism (not shown). A depending arm 74 provided on the opposite end of the movable plate 71 is pulled by a tension spring 75 so that when the projection 72 is released from the locking member 73, the tension spring 75 will rotate the movable plate about bearing shaft 61 in the counterclockwise direction so as to raise its rear end. Two perforations 71*a* are provided for the movable plate 71 at the intermediate portions thereof so that when the movable plate 71 is moved downwardly by depressing a cover plate 76 which covers the upper surface of the movable plate 71, reel driving shafts 63 mounted on deck 100A will project upwardly through these perforations 70*a*, thereby inserting the reel driving shafts 63 into reel hubs 103 of cassette C mounted on the movable plate 71. To the rear of the reel driving shafts 63 are positioned capstan shafts 65. Further, to the rear of the capstan shafts 65 are provided roller supporting members 64 which are pivotably mounted on pivot shaft 66 in the same manner as in the first embodiment. Accordingly, when the cassette C is loaded in the tape player, the pinch rollers 67 supported by the roller supporting members 64 are urged against the capstan shafts 65 to clamp the tape in the cassette between pinch rollers 67 and the capstan shafts 65. When either one of the pinch rollers 67 is selected, a cam 80*a* of a switching member 80 shown in FIG. 8 is caused to act upon one of the pins 77 secured to the roller supporting members 64 thereby urging the selected pinch roller 67 against one of the capstan shaft 65 through the tape. An electromagnet 78 for effecting such a switching is mounted on the deck 100A at its rear right corner and this electromagnet 78 is connected to be energized by a signal from a suitable detector, not shown, which detects a reference mark at one end of the channel of the tape.

An operating mechanism and an electric circuit for such switching operation are shown in FIG. 8. More particularly, the switching member 80 is mounted on the lower side of deck 100A to receive guide pins 79 in elongated slots 86 on both sides of the switching member 80. Cams 80*a* are provided for the switching member 80 such that they are engaged by the pins 77 of the roller supporting members 64. A notch 69 is provided for the switching member 80 to cooperate with a pin 87 secured to a plate cam 84 which is pivotably mounted on the bottom surface of deck 100A by means of a pivot pin 89 and is provided with a M-shaped guide opening 96 having two valleys 96A and 96B on the opposite sides of the pin 89. A pin 98 on an operating member 99 connected to the plunger 92 of the electromagnet 78 as at 90 is received in the guide opening 96. A tension spring 97 is connected to the operating member 99 to move plunger 92 away from the electromagnet 78. A compression spring 96*a* is connected to plate cam 84 as at 95 such that the spring snaps beyond a straight line interconnecting a point 94 at which the opposite end of the compression spring 96*a* is attached to the switching member 80 and the pivot pin 89 of the plate cam 84. Further, means 68 detecting a cassette C mounted on the upper surface of deck 100A is provided. The detecting means 68 in the form of a pin is secured to the intermediate resilient piece 82 of a switch $SW_2$ so that the detecting means is normally urged upwardly by the resiliency of the resilient piece 82 to project above the deck 100A. When the cassette C is in the hopped-up state as shown in FIG. 8, the switch $SW_2$ is closed to apply a potential to the base electrode of a transistor Tr in a control circuit 88 from a source +B via a slide switch $SW_1$ and a resistor R for energizing electromagnet 78. The slide switch $SW_1$ is provided with a projection 85 which is actuated by the operating member 83 in the form of a recess provided for the switching member 80.

Suppose now that the cassette C has been moved to the hopped-up state shown in FIG. 8 by the raising of movable plate 71, that the second channel was selected during previous tape running and that the switching member 80 has been moved to the right to assume the position shown in FIG. 2. As the cassette is hopped-up, switch $SW_2$ is closed to energize electromagnet 78 for rotating plate cam 84. Rotation of the plate cam moves the switching member 80 to the left through pin 87 and notch 69 thus selecting the first channel. On the other hand, if the first channel has been selected during the previous tape running slide switch $SW_1$ would not be closed even when switch $SW_2$ is closed whereby electromagnet 78 would not be energized. For this reason, irrespective of whether the first or second channel was selected during the previous running, whenever cassette C is loaded for the next running, reproduction of the first channel is always assured. Further, as the cam plate 84 is held in either one of the switched positions by the snap action of the spring there is no fear for the switching member 80 from being accidentally moved away from the switched position by the vibrations of the motor car.

What is claimed is:

1. In a tape player of the type having a sound reproducing head and wherein a cassette containing a pair fo reels on which a sound tape is wound is removably loaded in a predetermined position in said player and said tape is passed between a first drive pair comprising pinch roller and a capstan and then between a second drive comprising a pinch roller and a capstan, and said first and second tape drive pairs are selectively operated to reverse the direction of running of said tape with respect to said sound reproducing head, thereby enabling continuous reproduction of a plurality of channels recorded on said tape, the improvement which comprises the combination of switching means for selectively operating either one of said first and second pairs; control means for constantly urging said switching means in a given direction thereby permitting loading of said cassette while said tape is driven in a given direction; and a movable plate which is moved in a vertical direction with respect to the reel hubs of said cassette loaded in said player, said control means being actuated in response said switching means when said player is prepared for loading and unloading of said cassette.

2. The tape player according to claim 1 wherein said control means comprises a control member rotatably mounted on said base and provided with two actuating members, one said actuating member cooperating with said movable plate.

3. The tape player according to claim 2 wherein said control member comprises a bell crank.

4. The tape player according to claim 1 which further comprises a plate cam pivotably mounted on said base, means for moving said switching member in accordance with the rotary movement of said plate cam, and an electromagnet for rotating said plate cam.

5. The tape player according to claim 1 wherein said control member comprises a switch actuated by said switching means and an electromagnet actuated by said switch for operating said switching member; and an additional switch is connected in a circuit with said switch and said additional switch is operated by a movable plate when said plate is moved vertically with respect to said base.

6. The tape player according to claim 5 wherein said electromagnet is operatively connected to said switching member through a cam member provided with a snap spring.

* * * * *